Aug. 6, 1957  D. BLITZ ET AL  2,802,206
RADIO BOMB RELEASE SYSTEM
Filed July 3, 1945  2 Sheets-Sheet 1

INVENTORS
*Daniel Blitz*
BY *& Irving Wolff*
*C. D. Tuska*
ATTORNEY

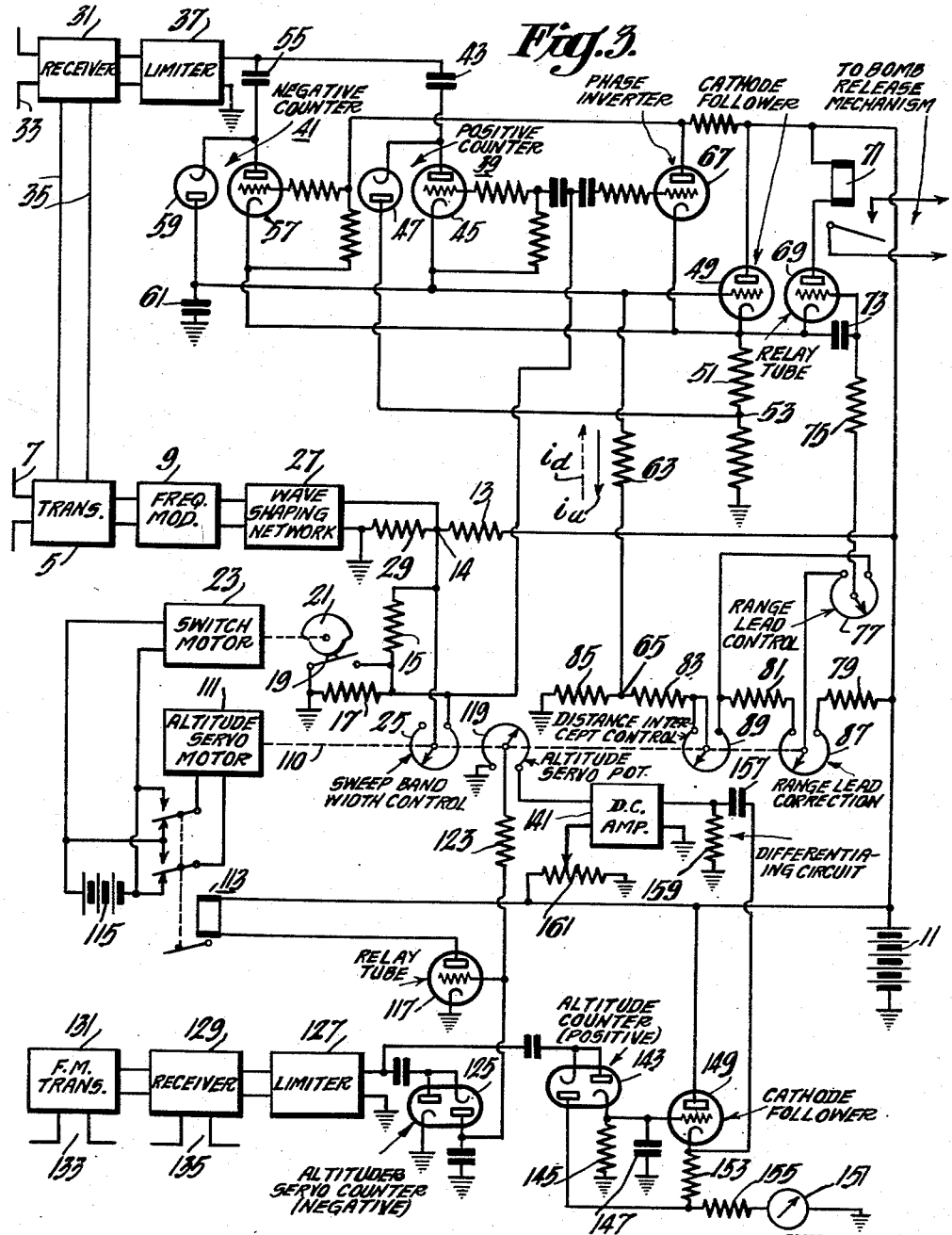

United States Patent Office 2,802,206
Patented Aug. 6, 1957

2,802,206
RADIO BOMB RELEASE SYSTEM

Daniel Blitz and Irving Wolff, Princeton, N. J., assignors, by mesne assignments, to the United States of America as represented by the Secretary of the Navy Application July 3, 1945, Serial No. 602,950

5 Claims. (Cl. 343—7)

This invention relates to radio bomb release systems, and more particularly to improvements in systems of the type described in copending U. S. application Serial No. 524,794, filed on March 2, 1944, by Royden C. Sanders, Jr., and William R. Mercer, and entitled Radio Bomb Release System, which issued December 17, 1946, as Patent No. 2,412,632.

The principal object of the present invention is to provide a system of the described type including means for automatically compensating the effects of climbing or diving of the bomber craft so as to provide correct operation at any rate of climb or dive within a predetermined range.

Figure 1:
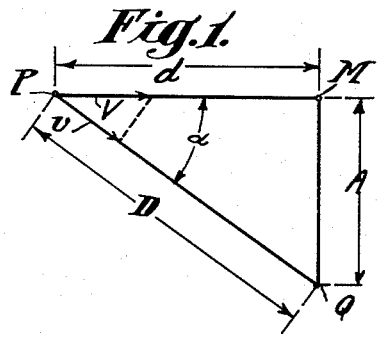
Figure 2:
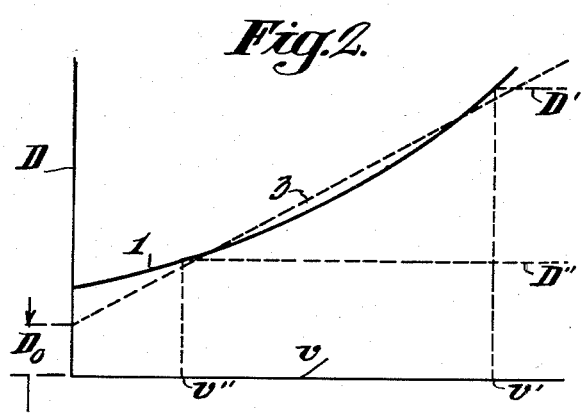
Figure 4:
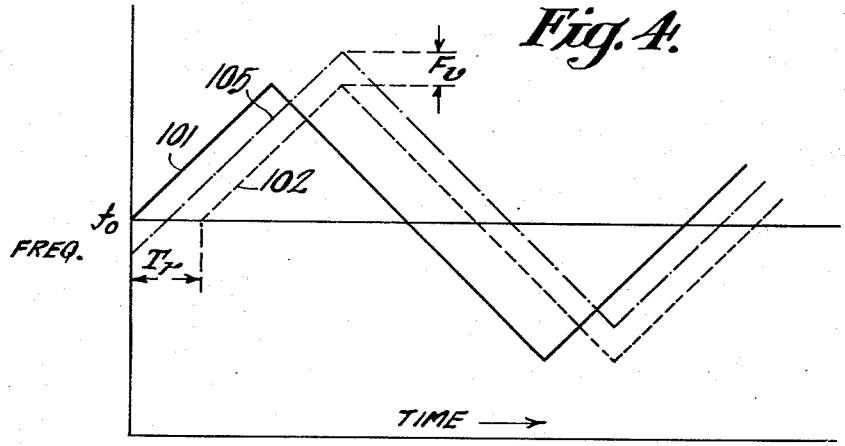
Figure 5:
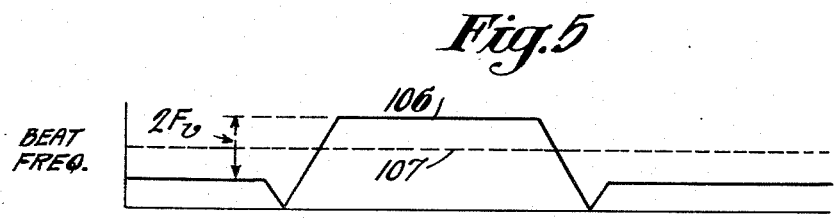

The invention will be described with reference to the accompanying drawings wherein:

Figure 1 is a diagram showing the geometry of a bomb release problem,

Figure 2 is a graph showing the relationship of slant range to slant speed for bomb release at a particular altitude, and the linear approximation to said relationship, Figure 3 is a schematic circuit diagram of a radio bomb release system embodying the present invention, Figure 4 is a graph illustrating the variations in frequency of the signals transmitted and received in the operation of the system of Figure 3, and Figure 5 is a graph illustrating the variations in frequency of the beat signal produced in the operation of the system of Figure 3.

The bomb release problem

Refer to Figure 1. It is assumed that an aircraft at the point P is flying horizontally at a velocity $v$ toward a point M, directly over a target at the point Q, at an altitude A. A bomb released at the altitude A without any vertical velocity will require a time $T_f$ to fall to the level of the target.

(1) $$A = \frac{gT_f^2}{2}$$

and (2) $$T_f = \sqrt{\frac{2A}{g}}$$

where $g$ equals the acceleration caused by gravity, 32 feet/sec.², approximately.

In order for the bomb to strike at the point Q, it must be released $T_f$ seconds before the craft reaches the point M. The time $T$ which must elapse before the craft reaches the point M is (3) $$T = \frac{d}{V}$$

If the horizontal speed $V$ and the horizontal component $d$ of the target range were known, the calculation of $T$ would be a simple matter. The condition for release is:

$T = T_f$, or substituting (2) in (3)

(4) $$\frac{d}{v} = \sqrt{\frac{2a}{g}}$$

Radio reflection equipment does not measure the horizontal distance $d$, but the true or slant distance $D$. Similarly, the horizontal speed $V$ is not measured directly, but its slant component $v$ is measured. Accordingly, it is necessary to determine the time $T$ in terms of these quantities. It is apparent from Figure 1 that at great distances or low altitudes from the target, the target depression angle $\alpha$ will be small, and the slant speed and slant range will be nearly the same as the horizontal speed and horizontal range. As the distance is decreased or the altitude increased, the differences between the slant and horizontal speeds and distances will increase.

Referring to Figure 2, the curve 1 shows the relation between slant speed $v$ and slant range $D$ which corresponds to one particular value of $T_1$, which in turn is the time of fall $T_f$ from an altitude $A_1$. Thus if a bomb is released from the altitude $A_1$, when $D$ and $v$ are of such values as to satisfy the relationship represented by the curve 1, the bomb will strike the target.

For every different altitude, there is a different relationship between $D$ and $v$ which must be satisfied for proper release. The curve 1 is thus but one of a family of similar curves. In the present system a linear approximation is used, rather than the actual $D-v$ relationship. This approximation need be accurate only within the range $v_1$ to $v_2$ of slant speeds which will occur in the practical operation of the system. The dash line 3 in Figure 2 is the linear approximation to the curve 1 which produces the smallest maximum error throughout the range of slant speeds from $v_1$ to $v_2$.

The equation of the line 3 is (5) $$D = mv + D_0$$

where $m$ is the slope of the line:

(6) $$m = \frac{D_2 - D_1}{v_2 - v_1}$$

and $D_0$ is the range intercept at zero speed, as indicated in Figure 2. As stated above, the relations shown in Figure 2 correspond to one specified altitude, $A_1$. For any other altitude, both $m$ and $D_0$ will have correspondingly different values. By setting in the values of $m$ and $D_0$ corresponding to the particular altitude $A$ at which a craft is flying, a substantially correct release may be obtained by satisfying the relationship of Equation 5.

In the above analysis it has been assumed that the bombing craft is in level flight at a constant altitude. Now suppose the altitude is changing at a rate of climb $Y$. (If the altitude is decreasing, $Y$ is negative.) The equation of fall is:

(7) $$A = \tfrac{1}{2}gT_f^2 - YT_f$$

and (8) $$T_f = \frac{Y \pm \sqrt{Y^2 + 2gA}}{g}$$

The altitude $A_y$ at which the bomber would have to fly, without climb, to cause the same time of fall as would be caused by flying at the altitude A with the rate of climb $Y$, is found by substituting Equation 8 in Equation 1.

(9) $$A_y = A + \frac{Y}{g}\sqrt{Y^2 + 2gA}$$

For the same time of fall, the difference between the altitudes when climbing and when flying level is

(10) $$A_y - A = \Delta A : \Delta A = \frac{Y}{g}\sqrt{Y^2 + 2gA}$$

For small values of $Y$ and large values of $A$, $\Delta A$ is approximately:

(11) $$\frac{Y}{g}\sqrt{2gA} = \frac{Y\sqrt{A}}{4}$$

According to the present invention, the values of $m$ and $D_0$ are set automatically to correspond substantially to the altitude $A_y$ instead of the true altitude $A$.

Radio and computer system

Refer to Figure 3. A radio transmitter 5 is provided with an antenna 7, and is connected to a frequency modulator 9, which may be of the type described in copending U. S. patent application Serial No. 471,003, filed January 1, 1943, by S. V. Perry, and entitled Capacity Modulator Unit, now abandoned, or any other known device for varying the frequency of operation of the transmitter 5 in accordance with the voltage applied to it. In the present illustration, the modulator 9 is energized in such manner as to provide triangular wave frequency modulation of the transmitter 5.

A D.-C. source 11 is connected across resistors 13, 15 and 17. An adjustable resistor 25 is connected across the resistor 15. A switch 19 is connected across the resistor 17, and is arranged to be cyclically opened and closed by a cam 21, continuously driven by a motor 23. This periodically changes the voltage at the junction point 14 of resistors 13 and 15 between two values which differ by an amount depending upon the setting of the resistor 25.

The point 14 is connected to a wave shaping circuit 27. The circuit 27 may be merely an integrating circuit, or may be of the type described in copending U. S. patent application Serial No. 546,537, filed July 25, 1944, by Royden C. Sanders, Jr., and entitled Wave Shaping Circuits, which issued July 9, 1946, as Patent No. 2,403,616. The circuit 27 converts the square wave voltage input from the point 14 to a substantially triangular wave voltage, which is applied to the modulator 9. A resistor 29 is included in the input circuit of the wave shaping circuit 27. By adjusting the resistor 25, the band width through which the frequency of the transmitter 5 is swept may be varied.

A receiver 31 is provided with an antenna 33, and is also coupled to the transmitter 5 through a transmission line 35. An amplitude limiter 37 is connected to the output of the receiver 31. The output circuit of the limiter 37 is connected to a pair of frequency responsive circuits comprising averaging cycle counters 39 and 41 respectively. The counter 39 includes a capacitor 43, connected from the limiter 37 to the anode of a triode 45 and to the cathode of a diode 47. The cathode of the triode 45 is connected to the control grid of an amplifier tube 49. The entire load resistance 51 associated with the tube 49 is connected in its cathode circuit so that it acts as a so-called "cathode follower." The anode of the diode 47 is connected to a tap 53 on the resistor 51.

The counter 41 includes a capacitor 55 connected from the limiter 37 to the anode of a triode 57 and to the cathode of a diode 59. The anode of the diode 59 is connected to the control grid of the cathode follower tube 49. The cathode of the triode 57 is connected to the upper end of the load resistor 51, at the cathode of the tube 49. The counters 39 and 41 are provided with a common storage capacitor 61, connected between the control grid of the tube 49 and ground. They also have a common load resistor 63, connected from the grid of the tube 49 to a point 65 on a voltage divider chain described hereinafter.

The control grid of the triode 45 of the counter 39 is coupled to the ungrounded end of the resistor 17, so that a square wave voltage is applied thereto in synchronism with the frequency modulation of the transmitter 5. The control grid of the triode 51 is coupled to the same point through a phase inverter 67, so that the square wave voltage applied thereto is 180° out of phase with that at the grid of the triode 45. The connections are such that the triode 57 is cut off and the triode 45 is conductive while the frequency of the transmitter 5 is increasing, and the triode 45 is cut off and the triode 57 is conductive while the transmitted frequency is decreasing.

The cathode of the cathode follower tube 49 is connected to the cathode of a relay amplifier tube 69. The anode circuit of the tube 69 includes the actuating coil of a relay 71. The contacts of the relay 71 are connected to the actuating circuit of a bomb release mechanism (not shown). The control grid of the relay tube 69 is by-passed to the cathode through a capacitor 73, and is connected through a resistor 75 to the adjustable contact of a variable voltage divider 77.

The voltage divider 77 is shunted across a portion of a voltage divider chain including fixed resistors 79, 81, 83 and 85, and variable resistors 87 and 89, serially connected across the D.-C. source 11. The voltages at the terminals of the voltage divider 77 are controlled by the variable resistors 87 and 89, and the potential at the control grid of the relay tube 69 is variable between these two voltages by adjustment of the voltage divider 77. The return point 65 of the counter load resistor 63 is the junction between the fixed resistors 83 and 85.

The adjustment and operation of the system thus far described is as follows:

Owing to the cyclical operation of the switch 19 by the motor 23, the frequency of the output of the transmitter 5 varies cyclically as shown by the solid line 101 of Figure 4. Some of this output is transferred directly to the receiver 31 through the line 35. The greater portion is radiated by the antenna 7. Some of the radiated energy strikes the selected target (not shown), and is reflected to the antenna 33. The time required for the transmitted energy to travel to the target and back to the antenna 33 is proportional to the slant range D from the aircraft to the target. The variations in frequency of the received energy are accordingly delayed with respect to those of the transmitted energy. The variation of frequency of the received signal as a function of time, assuming no relative motion between the aircraft and the target, is shown by the dot line 103. The delay $T_r$ is portional to the range D.

Now if the range is decreasing at a rate $v$, the frequency of the received signal will be increased, owing to Doppler effect. Thus the frequency of the received signal will vary with time as shown by the dash line 105. The increase in frequency $F_v$ is directly proportional to the speed $v$.

The direct and reflected signals from the transmitter 5 are mixed and detected in the receiver 31. The output of the receiver comprises a beat frequency signal, which has a frequency equal to the difference in the frequencies of the two signals applied to the receiver. The frequency of this beat signal varies with time as shown by the solid line graph 106 of Figure 5. The mean value of the beat frequency, indicated by the dash line 107 in Figure 5, is directly proportional to the range R, and is equal to:

$$(12) \qquad \frac{f_m f_s D}{246}$$

where $f_m$ is the modulating frequency in cycles per second, $f_s$ is the sweep width, or range of variation of the transmitter frequency, in megacycles per second, and R is the slant range in feet. The beat frequency varies cyclically above and below its mean value by the amount $F_v$. During increase of transmitter frequency the beat frequency is:

$$(13) \qquad f_u = \frac{f_m f_s D}{246} - \frac{2 f_0 v}{c}$$

where $f_0$ is the mean transmitted frequency (see Figure 4) in cycles per second, $v$ is the slant speed in feet per second, and $c$ is the velocity of wave propagation (the velocity of light) in feet per second. During decrease of transmitter frequency the beat frequency is:

$$(14) \qquad f_d = \frac{f_m f_s D}{246} + \frac{2 f_0 v}{c}$$

As mentioned above, the triode 57 of the counter 41 is cut off during increase of transmitted frequency, and the triode 45 of the counter 39 is conductive. During this period, the counter 39 operates to provide an average current $i_u$ in the direction of the solid arrow through the load resistor 63. This current is:

(15) $$i_u = k_1 f_u = k_1 \left( \frac{f_m f_s D}{246} - \frac{2f_0 v}{c} \right)$$

where $k_1$ is a constant directly proportional to the capacitance of the capacitor 43. The counter 41 does not operate.

During descrease of transmited frequency, the triode 45 is cut off and the counter 39 does not operate. The triode 57 is conductive, and the counter 41 provides an average current $i_d$ in the direction of the dash arrow through the load resistor 63. This current is:

(16) $$i_d = k_2 f_d = k_2 \left( \frac{f_m f_s D}{246} + \frac{2f_0 v}{c} \right)$$

where $k_2$ is a constant directly proportional to the capacitance of the capacitor 55. The common load capacitor 61 averages the pulsations in the voltage at the control grid of the cathode follower tube 49, so that the voltage between the cathode follower grid and ground is

(17) $$e_0 + \frac{i_u - i_d}{2} R_L = e_0 + \frac{R_L}{2}\left[ k_1\left(\frac{f_m f_s D}{246} - \frac{2f_0 v}{c}\right) - k_2\left(\frac{f_m f_s D}{246} + \frac{2f_0 v}{c}\right) \right]$$

where $e_0$ is the potential at the point 65 and $R_L$ is the resistance of the load resistor 63.

The cathode of the tube 49 is maintained at substantially the same potential as the control grid as long as the current through the resistor 51 is only the anode current of the tube 49. Thus the potential at the cathode of the relay tube 69 is the same as that at the grid of the tube 49. The potential at the control grid of the relay tube (referred to ground) is the voltage $e_1$ at the tap of the voltage divider 77. Thus the voltage $e_3$ between the cathode and the control grid of the relay tube is:

(18) $$e_3 = e_0 + \frac{R_L}{2}\left[ k_1\left(\frac{f_m f_s D}{246} - \frac{2f_0 v}{c}\right) - k_2\left(\frac{f_m f_s D}{246} + \frac{2f_0 v}{c}\right) \right] - e_1$$

Rearranging the terms,

(19) $$e_3 = e_0 - e_1 + D f_s (k_1 - k_2)\left(\frac{R_L}{2} \cdot \frac{f_m}{246}\right) - v(k_1 + k_2)\left(\frac{R_L}{2} \cdot \frac{2f_0}{c}\right)$$

The quantities $k_1$, $k_2$, $R_L$, $f_m$ and $f_0$ are all constants, determined in accordance with design considerations. Therefore Equation 19 can be written as:

(20) $$e_3 = e_0 - e_1 + K_1 f_s D - K_2 v$$

where $$K_1 = (k_1 - k_2)\left(\frac{R_L f_m}{2 \cdot 246}\right)$$

and $$K_2 = (k_1 + k_2)\left(\frac{R_L}{2} \cdot \frac{2f_0}{c}\right)$$

As long as $e_3$ is sufficiently large to bias the relay tube 69 to cut off, no current flows through the relay 71 and it remains open. However, when $e_3$ becomes equal to $e'_3$, the voltage at which the tube 69 starts to conduct, the relay 71 is closed. At this time

(21) $$e'_3 = e_0 - e_1 + K_1 f_s D - K_2 v$$

The slant range is therefore:

(22) $$D = \frac{K_2 v}{K_1 f_s} + \frac{e_1 + e'_3 - e_0}{K_1 f_s}$$

This may be expressed as Equation 5 above, $$D = mv + D_0$$

where

(23) $$m = \frac{K_2}{K_1 f_s}$$

and

(24) $$D_0 = \frac{e_1 + e'_3 - e_0}{K_1 f_s}$$

Thus by setting the values of $$\frac{K_2}{K_1 f_s}$$

and $$\frac{e_1 + e'_3 - e_0}{K_1 f_s}$$

in accordance with the altitude A, the relay can be made to operate at the proper release time, within the limits of the linear approximation of the corresponding $D - v$ curve.

It is apparent from Equation 23 that $m$ is inversely proportional to the band width $f_s$. Accordingly, the proper value of $m$ for any particular altitude A may be obtained by adjustment of the sweep width control 25. $D_0$, as shown by Equation 24, is also inversely proportional to the band width, and is directly proportional to the voltage which must be present across the counter load resistor 63 to cause the relay tube 69 to conduct. This voltage is the difference between the total bias from cathode to grid of the relay tube 69, ($e_0 - e_1$), and the cut off bias $e'_3$, and is a function of the settings of the variable resistors 89, 87, and 77, which control the bias $e_1$ at the grid of the relay tube 69. The variable resistor 89 is employed to control $D_0$ in accordance with the altitude.

The variable resistor 77 is provided to allow variation of the bias $e_1$ on the relay tube for the purpose of obtaining an adjustable range lead, so that release may be made to occur a certain distance in advance of the target. Since the voltage required for a given range lead will vary with altitude, the variable resistor 87 is included to set the voltage across the resistor 77 as a function of altitude. Thus a given setting of the resistor 77 will provide a given range lead, regardless of the altitude.

The controls 87, 89 and 25 are ganged on a shaft 110 in order that the modulation band width and the bias voltages may be adjusted simultaneously to correspond with the altitude. None of these quantities are linear functions of the altitude. The resistors 87 and 89 are designed with resistance-rotation characteristics comprising two linear portions of different slopes to provide approximately the required variations of voltage with rotation of the shaft 110. Practically, the errors introduced by this arrangement are negligible.

The modulation band width must be held within about one percent of the correct value. While this could be achieved with a tapered variable resistor, there would be difficulty in constructing such a device, and it would necessarily be large in order to obtain the required accuracy. On the other hand, it is relatively easy to make a variable resistor of reasonable size having an accurately linear resistance-rotation characteristic. By proper proportioning of the resistors 13, 15, 17 and 29, the variable resistor 25 may be made linear and yet provide the correct characteristic of band width vs. shaft position.

*Altitude servo system*

The shaft 110 may be set manually to a position corresponding to the altitude at which a bombing run is to be made. However, it is preferable to have the various adjustments made automatically, releasing the attention of the pilot to other matters. Accordingly, an altitude responsive servo system is provided for positioning the shaft 110.

A reversible motor 111 is coupled to the shaft 110, and is connected through a double-throw relay 113 to a source 115. The actuating coil of the relay 113 is connected in the anode circuit of a relay amplifier tube 117, like the relay tube 69. The control grid of the tube 117 is coupled to a bias source comprising an adjustable voltage divider 119 connected to the output circuit of a D.-C. amplifier 141. This bias is applied to the tube 117 through a resistor 123.

The resistor 123 comprises the load resistor for a counter circuit 125. The counter 125 is connected to the output circuit of an amplitude limiter 127, which in turn is connected to the output circuit of a receiver 129. A transmitter 131, including means for cyclically varying the transmitted frequency, is coupled to the receiver 129 and is provided with an antenna 133. A similar antenna 135 is connected to the receiver 129.

The counter 125, limiter 127, receiver 129, and transmitter 131 comprise a radio reflection altimeter, and cooperate in known manner to provide a voltage across the load resistor 123 bearing a predetermined relationship to the altitude H, and in opposing polarity to the bias voltage provided by the voltage divider 119. When the algebraic sum of this voltage and the voltage at the adjustable tap of the voltage divider 119 is negative with respect to the cut off voltage of the relay tube 117, the relay 113 is deenergized. This connects the motor to the source 115 in such polarity as to rotate the shaft 110 in the direction corresponding to increase of altitude. The tap of the voltage divider is rotated to produce more positive bias, until the voltage across the counter load resistor is neutralized. The relay tube 117 starts to conduct, energizing the relay 113 and disconnecting the motor 111 from its source 115.

The relay 113 is provided with a small "dead space" so that a slight increase of energization is required to close the upper contacts. Thus if the voltage across the counter load resistor 123 decreases, the relay will operate to its upper position, energizing the motor 111 to rotate the shaft 110 in the direction corresponding to decrease of altitude. Thus the shaft 110 is maintained substantially continuously at a position such that the voltage at the tap of the voltage divider 119 corresponds to the altitude.

Rate of climb compensation

If the voltage across the terminals of the voltage divider 119 is maintained constant at a predetermined value, the angular position of the shaft 110 will bear a predetermined relationship to the altitude at all times. In accordance with the present invention however, the shaft 110 is set off from the position corresponding to the altitude by an amount ΔA, in accordance with the rate of climb Y.

A counter circuit 143 is coupled to the output circuit of the limiter 127. The counter 143 is connected to provide across its load resistor 145 a positive voltage which increases with increase of altitude. The load resistor 145 is bypassed by a capacitor 147, and is connected to the control grid of a cathode follower tube 149. The load circuit of the tube 14 includes a meter 151 calibrated in units of altitude, and two series resistors 153 and 155. The anode of the discharge diode of the counter 143 is connected to the junction of the resistors 153 and 155. The values of the resistors 153 and 155 are selected so that the voltage $E_a$ produced at the cathode of the tube 149 in response to the beat frequency output of the limiter 127 is approximately

(25) $$K_3\sqrt{A}$$

where $K_3$ is a constant.

The cathode of the tube 149 is connected through a capacitor 157 to a resistor 159. The values of these elements are selected with reference to the usual range of the rate climb of the bomber craft, so that corresponding changes in the altitude voltage $E_a$ will be differentiated with respect to time, providing a voltage proportional to $$\frac{dE_a}{dt}$$

across the resistor 159.

The input circuit of the D.-C. amplifier 141 is connected to the resistor 159. The output circuit of the amplifier 141 includes an adjustable voltage divider 161, connected across the source 11. The amplifier 141, in addition to amplifying, inverts the polarity of the input voltage, i. e. a positive input results in an amplified negative output, and vice versa. The voltage divider 161 is adjusted to provide a constant voltage of for example approximately 150 volts at its tap, so that in the absence of output from the D.-C. amplifier 141, only this voltage will appear across the voltage divider 119, and hence the position of the shaft 110 will correspond to the true altitude A.

In the operation of the system, the voltage at the cathode of the tube 149 is substantially $$E_a = K_3\sqrt{A}$$

as mentioned above. As long as the altitude is constant, $E_a$ is constant, and no voltage appears across the resistor 159. The shaft 110 is accordingly maintained automatically at the position corresponding to the true altitude A.

When the altitude is changing, a voltage $E_y$, substantially proportional to the time rate of change of the voltage $E_a$, appears across the resistor 159.

(26) $$E_y = \frac{dE_a}{dt} = \frac{d(K_3\sqrt{A})}{dt} = \frac{K_3}{\sqrt{A}} \frac{dA}{dt}$$

But $$\frac{dA}{dt}$$

is the rate of climb, Y. Therefore,

(27) $$E_y = K_3 \frac{Y}{\sqrt{A}}$$

This voltage is amplified and reversed in polarity by the amplifier 141 and added to that provided by the voltage divider 161. Thus when the craft is climbing, the voltage across the voltage divider 119 is reduced from its normal value by an amount

(28) $$E'_y = K_4 \frac{Y}{\sqrt{A}}$$

where $K_4$ is $K_3$ times the gain of the amplifier 141. Similarly, negative climb, or descent, increases the voltage applied to the voltage divider 119.

The voltage at the tap of the voltage divider 119 is the product of the angular position of the shaft 110 and the total voltage across the terminals of the voltage divider 119. Thus the variation $E'_y$ in the applied voltage causes the voltage at the tap to vary by an amount proportional to A times $E'_y$. This causes the shaft 110 to rotate from the position corresponding to the true altitude by an amount substantially proportional to $E'_y A$.

(29) $$E'_y A = K_4 \frac{YA}{\sqrt{A}} = K_4 Y\sqrt{A}$$

By proper adjustment of the gain of the amplifier 141, the value of the constant $K_4$ may be made such that the change in position of the shaft 110 corresponds to $$\Delta A = \frac{Y\sqrt{A}}{4}$$

This is the condition indicated by Equation 11 for approximate compensation of the effects of climb upon the time of fall.

Although the invention has been described as embodied in a specific type of automatic bomb release system, it is equally applicable to any other bomb release system wherein adjustment is made for the altitude of the bombing craft. The altitude adjustment will be varied from that corresponding to the true altitude in accordance with the rate of climb, as in the described system, to provide substantial correction of the effect of said climb upon the computed time of fall of the bomb.

Thus the invention has been described as an improvement in bomb release systems of the type wherein the altitude, distance and speed of a bomber with respect to a target are determined and the information used automatically to effect release at the proper time. Approximately correction is made automatically for the effects of climb or dive upon the release, by altering the altitude response of the system in accordance with the rate of change of altitude.

We claim as our invention:

1. In a radio bomb release system including frequency modulated transmitter means, a receiver, counter means differentially responsive to the output of said receiver during increase and decrease respectively of the frequency of said transmitter, relay means responsive to the output of said counter means to effect release of a bomb upon the attainment of a predetermined magnitude by the output of said counter means, an altimeter, means responsive to said altimeter to control the modulation band width of said transmitter means, means for applying a bias to said relay means, and means responsive to said altimeter to control said bias; means connected to said altimeter and responsive thereto to produce a voltage of a magnitude which is a predetermined function of altitude, means for differentiating said voltage with respect to time to provide a second voltage of a magnitude which is a predetermined function of rate of climb, and means responsive to said second voltage to bias said means responsive to said altimeter.

2. In combination on an aircraft with an automatic bomb release system responsive to target range and speed and altitude information to drop a bomb, a system for compensating the effect upon the operation of said system of a vertical component of velocity of said aircraft, including altimeter means for providing an electrical output bearing a predetermined relationship to altitude of said craft, means responsive to said output to adjust said bomb release system in accordance with said altitude, means for providing a second electrical output bearing a predetermined relationship to the rate of climb of said craft, and means responsive to said second electrical output to alter said adjustment of said bomb release system by an amount corresponding to a change in altitude.

$$\Delta A = \frac{Y\sqrt{A}}{4}$$

wherein A is the altitude of said craft and Y is the rate of climb.

3. In a bomb release system including an altitude shaft, an altimeter, and means for setting the position of said shaft in response to said altimeter, a system for compensating the effect of rate of climb, comprising means responsive to said altimeter to produce a voltage substantially proportional to $\sqrt{A}$, wherein A is the altitude, means for differentiating said voltage to provide a second voltage proportional to $$\frac{Y}{\sqrt{A}}$$

where Y is the rate of change of altitude, and means responsive to said second voltage to bias accordingly said means for setting the position of said shaft, whereby said altitude shaft is set off from a position corresponding to the altitude by an amount proportional to $Y\sqrt{A}$.

4. In a bomb release system responsive to range, speed and altitude information to effect release of a bomb upon the attainment of a predetermined relationship between said factors, the method of compensating said system for the effects of a rate of change of said altitude information which comprises the steps of converting said altitude information to a control force substantially proportional to $\sqrt{A}$, where A is the altitude, differentiating said converted information with respect to time, and supplying said converted and differentiated information to said bomb release system in addition to said altitude information.

5. In a bomb release system responsive to altitude information to determine time of release of a bomb, a radio altimeter of the frequency modulation type, means connected to said altimeter and responsive thereto to supply altitude information to said release system, a beat frequency responsive cycle counter circuit connected to said altimeter, a voltage differentiating circuit connected to said counter circuit, and further means responsive to the output of said differentiating circuit to bias said first-mentioned means system, altering the altitude information supplied to said bomb release system by an amount bearing a predetermined relationship to the rate of change of said altitude.

No references cited.